(12) United States Patent
Riverin

(10) Patent No.: US 6,484,668 B2
(45) Date of Patent: Nov. 26, 2002

(54) DEVICE FOR SEA URCHINS PICKING

(76) Inventor: Marc Riverin, 34, rue Babin, Baie-Comeau, QBC (CA), G4Z 3A6

( * ) Notice: Subject to any disclaimer, the term of this patent is extended or adjusted under 35 U.S.C. 154(b) by 0 days.

(21) Appl. No.: 09/826,876

(22) Filed: Apr. 6, 2001

(65) Prior Publication Data

US 2001/0035133 A1 Nov. 1, 2001

Related U.S. Application Data

(60) Provisional application No. 60/195,210, filed on Apr. 7, 2000.

(51) Int. Cl.[7] ............... A01K 63/02; A01K 61/00; B01D 29/00
(52) U.S. Cl. ............... 119/201; 119/213; 210/416.2
(58) Field of Search ............... 119/201, 202, 119/206, 213; 210/416.2; 299/8; 406/49

(56) References Cited

U.S. PATENT DOCUMENTS

| 4,193,737 A | 3/1980 | Lemmon | 415/73 |
|---|---|---|---|
| 4,232,903 A | 11/1980 | Welling et al. | 299/8 |
| 4,239,019 A | * 12/1980 | Andrews | 119/201 |
| 4,257,723 A | 3/1981 | Kwee | 406/49 |
| 4,685,742 A | 8/1987 | Moreau | 299/8 |
| 4,756,671 A | 7/1988 | Grimes et al. | 417/53 |
| 4,797,206 A | * 1/1989 | Lynch | 210/416.2 |
| 4,842,336 A | 6/1989 | Erämetsäet al. | 299/8 |
| 4,865,725 A | 9/1989 | Metais | 210/136 |
| 4,879,026 A | 11/1989 | Metais | 210/123 |
| 4,994,178 A | * 2/1991 | Brooks | 210/146.2 |
| 5,655,245 A | * 8/1997 | Bunch | 119/232 |
| 6,112,699 A | * 9/2000 | Saxby et al. | 119/213 |

* cited by examiner

Primary Examiner—Charles T. Jordan
Assistant Examiner—Elizabeth Shaw

(57) ABSTRACT

The present invention concerns a device for sea urchins picking or the like from a water-filed area and collecting the urchins into a collecting member without damaging the same. The device includes an operable picking member for intaking and conveying an urchin-water mixture via a piping system into the collecting member, a draining system for draining water of the mixture from the collecting member and a pumping member for ensuring flow of the mixture within the picking member, piping system and collecting member, and of the water through the draining system.

16 Claims, 11 Drawing Sheets

DEVICE FOR SEA URCHINS PICKING

CROSS REFERENCE TO RELATED APPLICATION

This application is related to U.S. provisional application for patent No. 60/1195,210 filed on Apr. 7, 2000.

FIELD OF THE INVENTION

The present invention relates to a mechanism for collecting objects laying down at the bottom level of different water basin, and more particularly, to a device for sea urchins or sea hedgehogs picking or the like and collecting the same.

BACKGROUND OF THE INVENTION

For ages, seawater-filled areas and streams, rivers and waterways have been a source of food for humans. Regularly, new species of edible fish or seafood start to be commercially exploited. Consequently, an important new market of sea urchins and other animals living at the bottom of seas, oceans and rivers, and the like started to develop.

Traditionally sea urchin picking is a generally manual work performed by a diver at the bottom of reefs and collecting them in a basket or the like. This relative archaic method is slow, tedious and also not economical. There also exists a relatively high potential for accidents since the diver must resurface to empty his basket(s) a large number of times during a working day.

U.S. Pat. No. 4,193,737 granted on Sep. 22, 1977 to Lemmon and U.S. Pat. No. 4,756,671 granted on Feb. 28, 1983 to Grimes disclose fish pumping systems, which pump fish and water passing nearby their location using submersible rotary impeller means; non-submersible impellers could also be used.

The limitation of the prior art is that it is impossible picking sea urchins or non-living objects weighting approximately up to two pounds (2 lbs) from a water-filed area and automatically collecting them into collecting areas without potentially high damages of the sea urchins.

OBJECTS OF THE INVENTION

It is therefore a general object of the present invention to provide a device for sea urchins picking that obviates the above-mentioned disadvantages.

Another object of the present invention is to provide a device for sea urchins picking that allows for gathering the sea urchins without any damage/hurt to the same, thereby allowing for collected young small sea urchins to be returned into the sea.

A further object of the present invention is to provide a device for sea urchins picking that allows for continuous and economical gathering process.

Still another object of the present invention is to provide a device for sea urchins picking that is simple, adaptable, and easy to build.

Still a further object of the present invention is to provide a device for sea urchins picking that is adaptable for operating by a person or by a different operating system (for example optical or acoustical).

Yet another object of the present invention is to provide a device for sea urchins picking that is efficient and requires a relatively low power pumping system.

An advantage of the present invention is that the device for sea urchins picking is also capable of picking other living and non-living objects from the waterbed with a weight up to two pounds (2 lbs) or even more.

Other objects and advantages of the present invention will become apparent from a careful reading of the detailed description provided herein, with appropriate reference to the accompanying drawings.

SUMMARY OF THE INVENTION

According to the present invention, there is provided a sea urchin collecting device for allowing an intended user to individually harvest sea urchins located within a body of liquid, said device allowing for the individual and sequential collecting of sea urchins having an urchin outer diameter below a predetermined threshold outer diameter, said device comprises:

a collecting tube for individually collecting at least one of said sea urchins, said collecting tube defining a tube first end, a tube second end and a tube intermediate segment extending therebetween, said tube defining a tube inner diameter for allowing sequential movement within said tube of individual sea urchins having an urchin outer diameter below said predetermined threshold urchin outer diameter while preventing adjacent sea urchins from being in a side by side relationship within said tube, said tube being manually maneuverable for allowing said intended user to manually position said tube first end adjacent a targeted sea urchin located within said body of liquid;

a pump hydraulically coupled to said tube second end for pumping an urchin-liquid mixture including targeted sea urchins and adjacent portions of said body of liquid into a collecting means, said collecting means being coupled to said pump.

Preferably, the device further comprises a separating means in communication with said collecting means for separating said targeted sea urchins from said portions of said body of liquid.

Preferably, the pump and said separating means are positioned on a buoyant body for maintaining said pump and said separating means above the surface of said body of water when said tube first end is positioned below said surface of said body of water in an operational configuration; whereby said tube first end is at least partially decoupled from said pump and said separating means by said collecting tube and said buoyant so as to facilitate manual maneuvering of said tube adjacent said tube first end.

Typically, the separating means is located downstream relative to said pump, said separating means being located between said collecting means and said pump.

Typically, the separating means includes a container, said container being provided with at least one drainage aperture extending therethrough, said drainage aperture allowing said pump to drain liquid out of said container while said container retains said sea urchins therein.

Preferably, the separating means includes:

a first container and a second container, each of said first and second containers being provided with at least one corresponding drainage aperture extending therethrough, each of said drainage aperture allowing the drainage of liquid from a corresponding one of said first or second containers and the retention of sea urchins within a corresponding one of said first or second containers;

an hydraulic circuitry including valve means for selectively allowing either one of said first or second containers to be individually filled with said liquid-urchin mixture, whereby said hydraulic circuitry allows said first or second containers to be individually filled with said liquid urchin mixture while the other one of said first or second containers is being individually drained from said liquid.

Preferably, the device further comprises a pre-filling means hydraulically coupled to either one of said first or second containers for ensuring that a corresponding either one of said first or second containers maintains a predetermined minimal amount of liquid therein.

Preferably, the pre-filling means includes a pre-filling hydraulic circuitry hydraulically coupled to said corresponding either one of said first or second containers for redirecting a portion of said liquid having been drained from said corresponding either one of said first or second containers into said corresponding either one of said first or second containers.

Preferably, the hydraulic circuitry includes:

a first and a second inlet duct hydraulically coupling said tube second end respectively to said first and second containers;

a first and a second inlet duct valve for selectively allowing and preventing the flow of said liquid-urchin mixture respectively in said first and second inlet ducts.

Preferably, the hydraulic circuitry further includes:

a first and a second outlet duct respectively hydraulically coupling said first and second containers to said pump;

a pump valve means for selectively allowing and preventing the flow of liquid from said first and a second outlet ducts to said pump.

Typically, at least one of said first or second containers includes a container door, said container door being movable between a door closed configuration and a door open configuration, wherein when said door is in said door closed configuration said container door retains said urchins within a corresponding one of either said first or second containers and wherein when said container door is in said door open configuration said container door allows said urchins to be retracted from a corresponding one of either said first or second containers.

Alternatively, the container door is positioned so as to be pivotable towards said door open configuration under the action of gravity and wherein said door is provided with a releasable door locking component for releasably locking said container door in said door closed configuration.

Preferably, either one of said first or second containers further includes a container basket, said container basket being movable between an extended and a retracted configuration wherein when said container basket is in said retracted configuration said container basket is confined to a corresponding either one of said first or second containers and wherein when said container basket is in said extended configuration at least a portion of said container basket protrudes from said urchin removing aperture for facilitating the retrieval of sea urchins therefrom.

Preferably, the pump is a rotary pump, said rotary pump being positioned downstream relative to said separating means.

Alternatively, the pump includes;

a pump housing defining a first and a second housing aperture;

a first and a second pump inlet ducts, said first and second pump inlet ducts being in fluid communication with said tube second end and respectively with said first and second housing apertures;

a first and a second pump outlet ducts, said first and second pump outlet ducts being in fluid communication with said separating means and respectively with said first and second housing apertures;

a first and a second pump inlet duct valve for selectively allowing and preventing the flow of said liquid-urchin mixture respectively in said first and second pump inlet ducts;

a first and a second pump outlet duct valve for selectively allowing and preventing the flow of said liquid-urchin mixture respectively in said first and second pump outlet ducts;

a reciprocating piston slidably mounted within said pump housing for alternatively increasing. and decreasing the hydraulic pressure of said liquid-urchin mixture adjacent said first and second housing apertures, whereby when said hydraulic pressure is increased by said piston adjacent either one of said first or second housing apertures a corresponding one of said first or second pump inlet duct valve is closed and a corresponding one of said first or second pump outlet duct valve is opened for allowing a fraction of said liquid-urchin mixture within said pump housing to be discharged towards said separating means and the hydraulic pressure is decreased by said piston adjacent the opposed first or second housing apertures with a corresponding one of said first or second pump outlet duct valve closed and a corresponding one of said first or second pump inlet duct valve opened for allowing a fraction of said liquid-urchin mixture emanating from said tube second end to fill at least a portion of said pump housing.

Alternatively, the pump includes:

a pump housing defining a first and a second housing aperture;

a first and a second pump inlet ducts, said first and second pump inlet ducts being in fluid communication with said tube second end and respectively with said first and second housing apertures;

a first and a second pump outlet ducts, said first and second pump outlet ducts being in fluid communication with said separating means and respectively with said first and second housing apertures;

a first and a second pump inlet duct valve for selectively allowing and preventing the flow of said liquid-urchin mixture respectively in said first and second pump inlet ducts;

a first and a second pump outlet duct valve for selectively allowing and preventing the flow of said liquid-urchin mixture respectively in said first and second pump outlet ducts;

a pressure creating means for increasing the hydraulic pressure of said liquid-urchin mixture within said pump housing;

a reciprocating pump valve slidably mounted within said pump housing for alternatively allowing the flow of said liquid-urchin mixture into or out of said first and second housing apertures.

BRIEF DESCRIPTION OF THE DRAWINGS

In the annexed drawings, like reference characters indicate like elements throughout.

DETAILED DESCRIPTION OF THE PREFERRED EMBODIMENTS

With reference to the annexed drawings the preferred embodiments of the present invention will be herein described for indicative purposes and by no means as of limitation.

Figure 1:
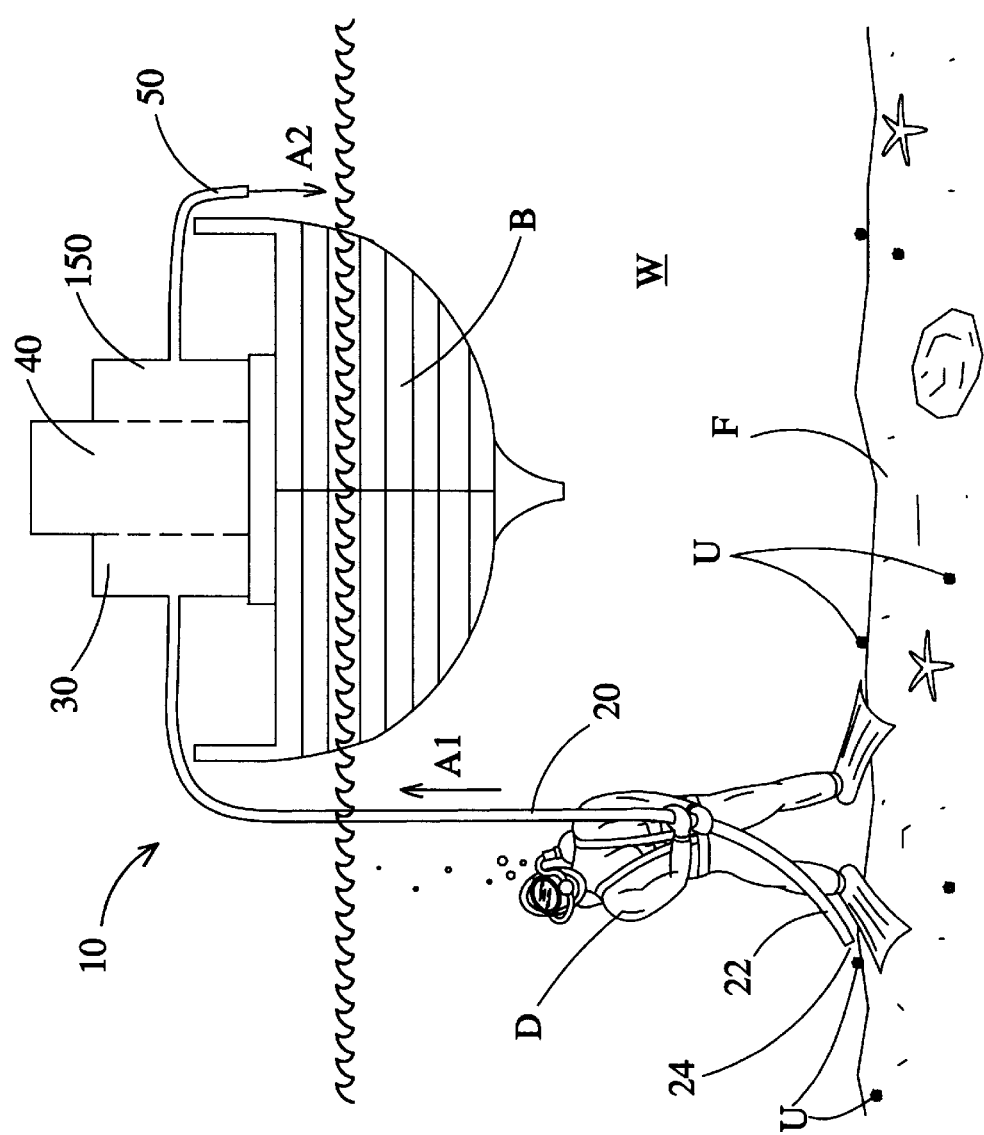
FIG. 1 is an elevation view of an embodiment of a device for sea urchins picking according to the present invention in a working configuration.
Figure 2:
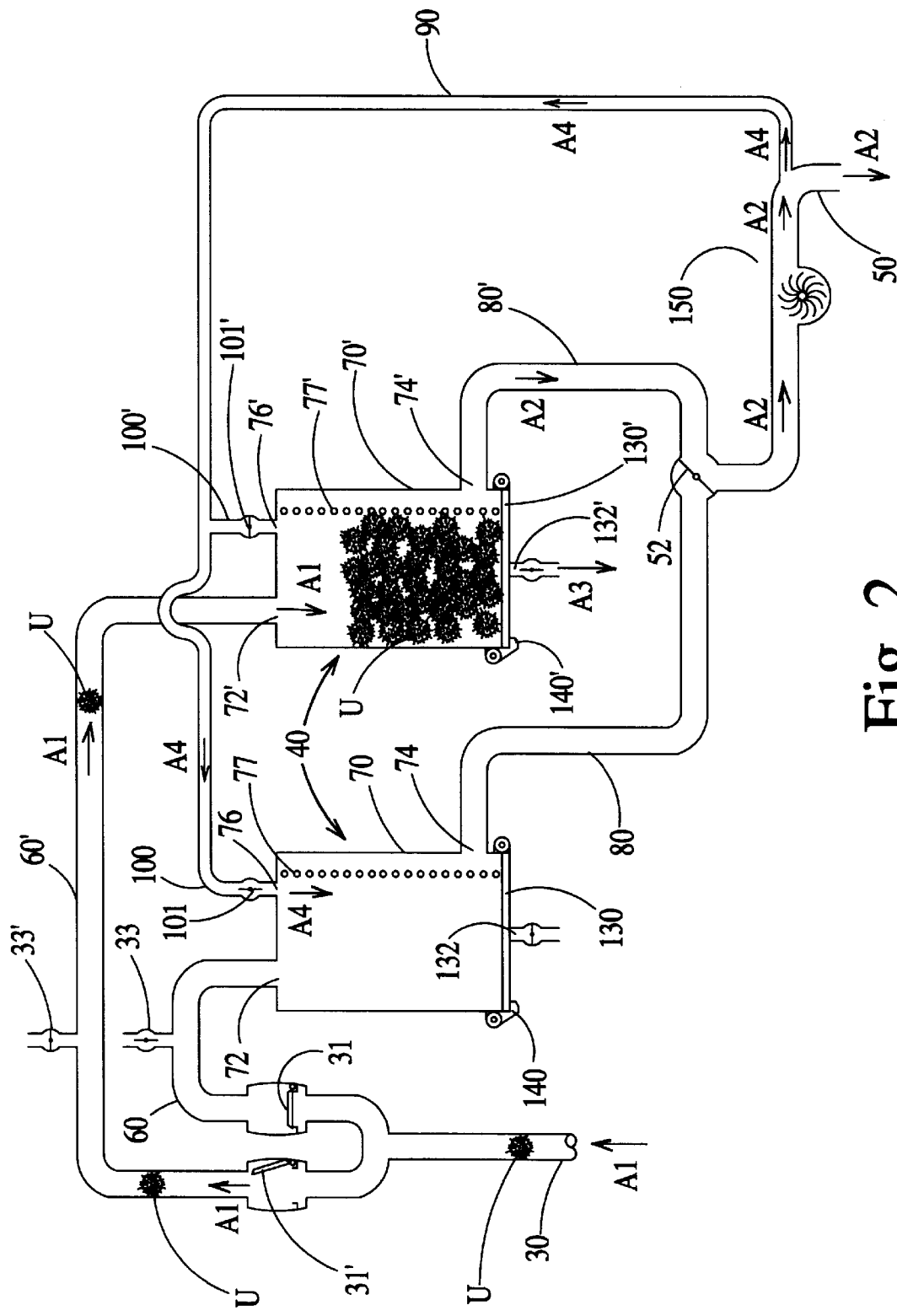
FIG. 2 is a schematic diagram of the embodiment of FIG. 1 in a first tank filling configuration.
Figure 2A:
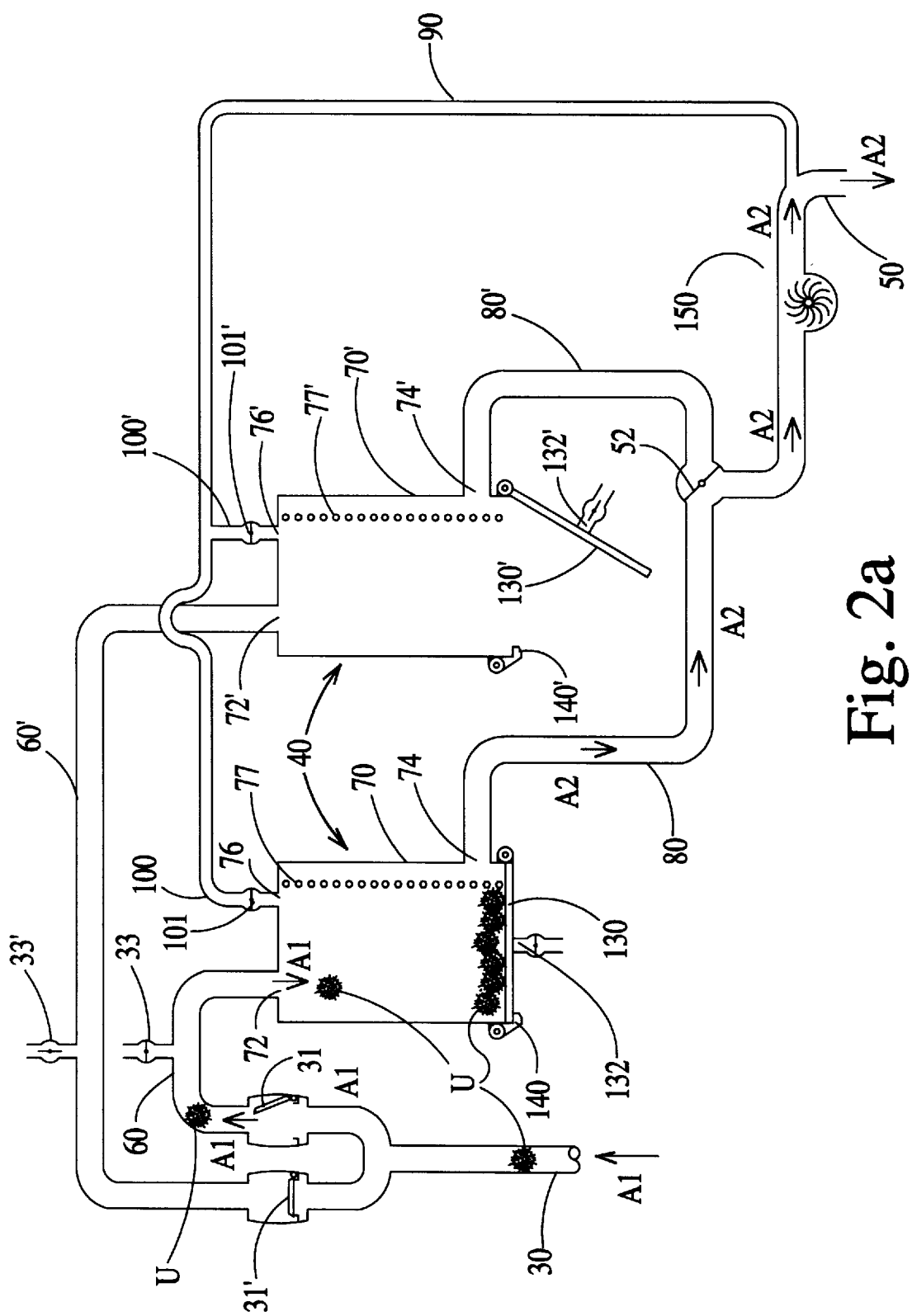
FIG. 2a is a similar to FIG. 2 illustrating the filling of the second tank.

Referring to FIGS. 1 to 2a, there is shown an embodiment of a device 10 in accordance to the present invention for sea urchins U picking or the like from a water-filed area W. The device 10 collects the urchins U into a collecting means 40 without damage to the same and comprises an operable picking means 20 for intaking a urchins-water mixture A1 and conveying that mixture A1 via a piping system 30 into the collecting means 40, a draining system 50 for draining the water A2 of the mixture A1 from the collecting means 40, and a pumping means 150 for ensuring flow of the mixture A1 within the picking means 20, piping system 30 and collecting means 40, and of the water A2 through the draining system 50.

The picking means 20 is preferably a flexible tubing adjustably connected to the piping system 30. The tubing 20 has an intake opening 24 at an operating end 22 and is submerged into the water-filled area W.

The floor F of the water-filled area W is covered with many sea urchins U, which can easily be found and picked one after the other by the operator or diver D operating the intake opening 24 of the tubing 20 in close proximity to each sea urchin U.

The sea urchins U will be stored in one of the recuperating tanks 70, 70' (see FIGS. 2, 2a, 3 and 3a) preferably located on the floating platform B of FIG. 1.

The piping 30 and draining 50 systems are preferably composed of rigid tubings with inner diameter passage adapted for easy flowing of one of the urchins U at a time, as schematically illustrated in FIGS. 2 and 2a.

Referring to FIGS. 2, and 2a, the collecting means 40 has a plurality, preferably two tanks 70, 70'. The piping system 30 has also at least and preferably two piping subsystems 60, 60' integrally extending from the piping system 30 via respective individual anti-backflow valve 31, 31'. The draining system 50 has at least and preferably two draining subsystems 80, 80' integrally continuing into the draining system 50 via a selective gate 52. Each piping subsystem 60, 60'. is connected to a corresponding draining subsystem 80, 80' and a corresponding tank 70, 70'. Each tank 70, 70' has a fill 72, 72' and a drain 74, 74' openings connected to the piping subsystem 60, 60' and to the draining subsystem 80, 80' respectively.

Preferably, the draining system 50 has a replenishment module 90 (see FIGS. 2 and 2a) extending from the same 50 with at least and preferably two replenishment submodules 100 and 100' integrally extending from the replenishment module 90. Each tank 70, 70' has a secondary fill opening 76, 76' connected to a respective replenishment submodule 100, 100' for partially filling the tank 70, 70' with a portion A4 of drained water A2 of the mixture A1 to ensure smooth falling of the urchins U into the same 70, 70'. Optional respective water filling gate 101, 101' controls the flow of water A4 through its respective secondary fill opening 76, 76'.

Referring to FIGS. 2 and 2a, each tank 70, 70' has a removable servicing cover 110, 110' and a wire netting 77, 77' located inside the tank 70, 70' at the drain opening 74, 74' for preventing the urchins U from escaping from the tank 70, 70'. Alternatively, as shown in FIGS. 3 and 3a, the tank 70a, 70a' could have a netting basket 75, 75' adjustably and removably secured inside the same for collecting the urchins U.

Figure 3:
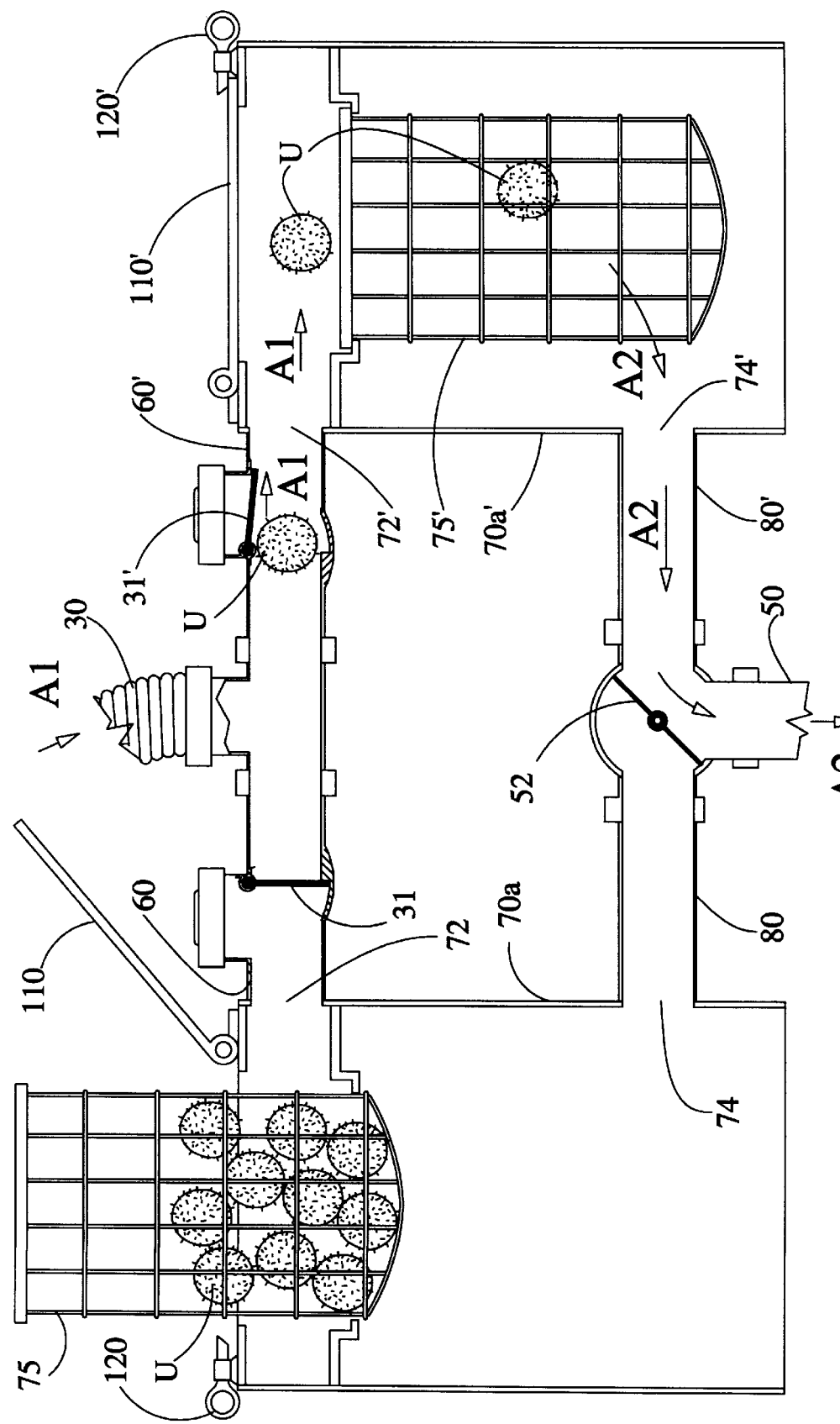
FIG. 3 is a partial section view of a second embodiment of the piping system and the collecting means in a first tank filling configuration.
Figure 3A:
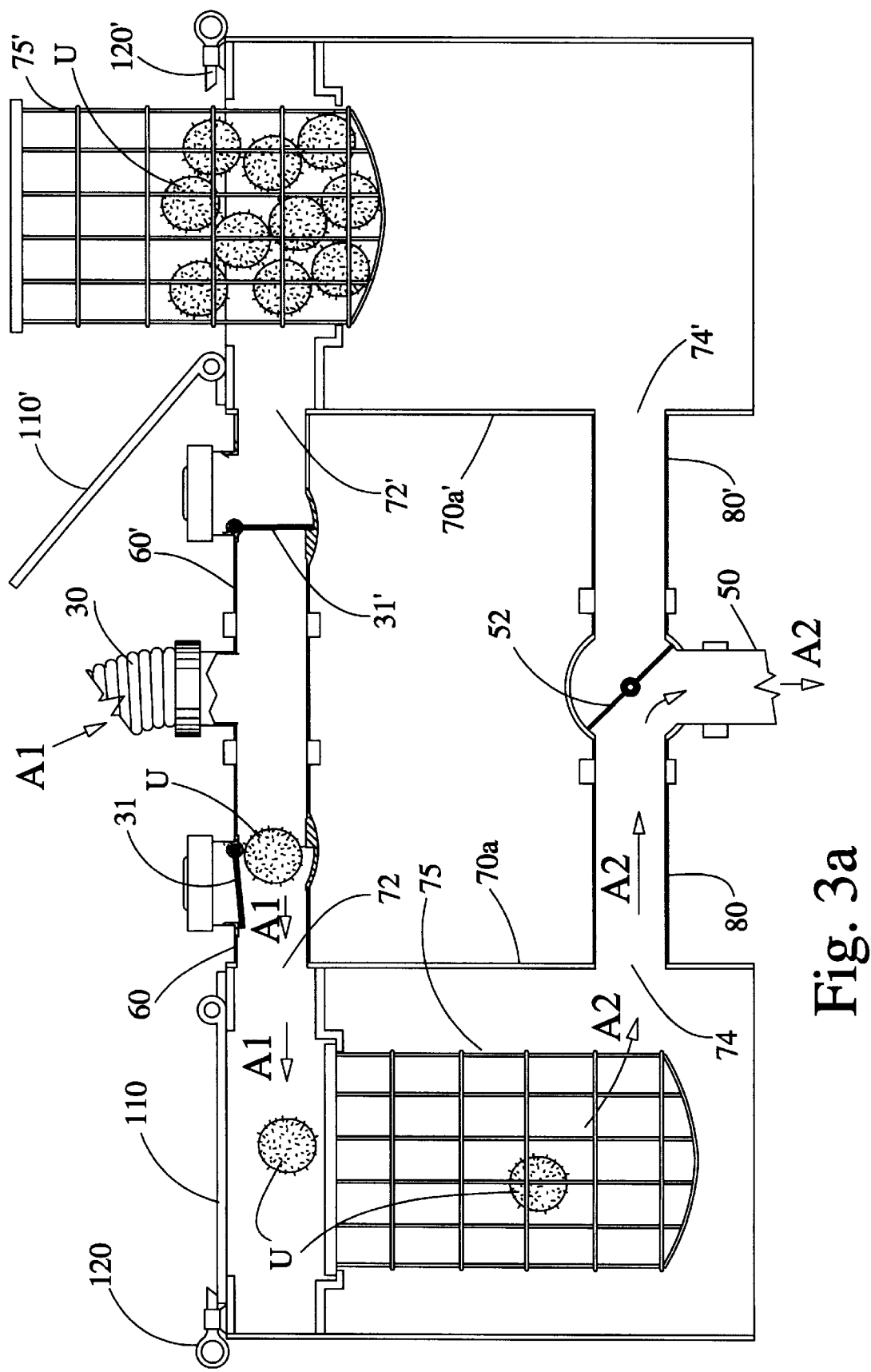
FIG. 3a is a similar to FIG. 3 showing the same embodiment with the filling of the second tank.

As illustrated in FIGS. 3 and 3a, the cover 110, 110' is pivotably and preferably sealably secured to the second embodiment of the tank 70a, 70a' and has a latch mechanism 120, 120' to latch the same in a closed position against the tank 70a, 70a'. The cover 110, 110' could include both the primary 72, 72' and the secondary 76, 76' fill openings (non shown).

The tank 70, 70' has a bottom wall 130, 130' (see FIGS. 2 and 2a) with preferably a second drain opening 132, 132' to empty the same. Alternatively, the bottom wall 130, 130' is pivotably and sealably secured to the tank 70, 70' and has a latch mechanism 140, 140' to latch the same in a closed position against the tank 70, 70'.

Referring to FIGS. 2 and 2a, each piping subsystem 60, 60' has an exhaust valve 33, 33' positioned downstream of the anti-backflow valve 31, 31' to allow for purging of the device 10 whenever required for maintenance, repairs or the like.

The pumping means 150, is connected either to the draining system 50 (as shown in FIGS. 2 and 2a), or to the piping system 30 (as shown in FIGS. 4 to 6a).

The pumping means 150 can be a water-vacuum pump, a double-action piston pump or the like.

Figure 5:
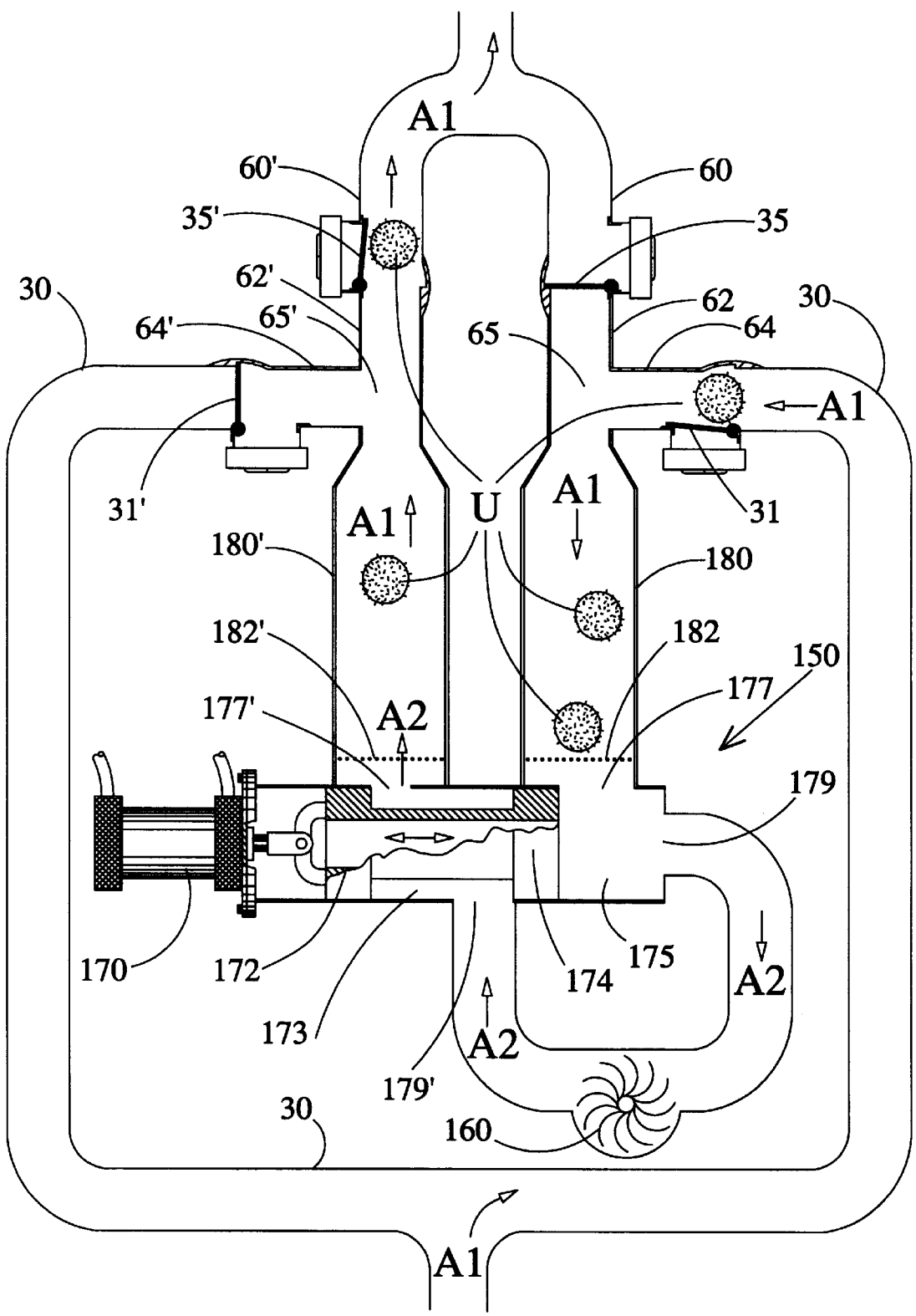
FIGS. 5 and 5a are similar to FIGS. 4 and 4a showing a fourth embodiment of the piping system including a water-vacuum pump connected to a double-piston plunger.
Figure 6:
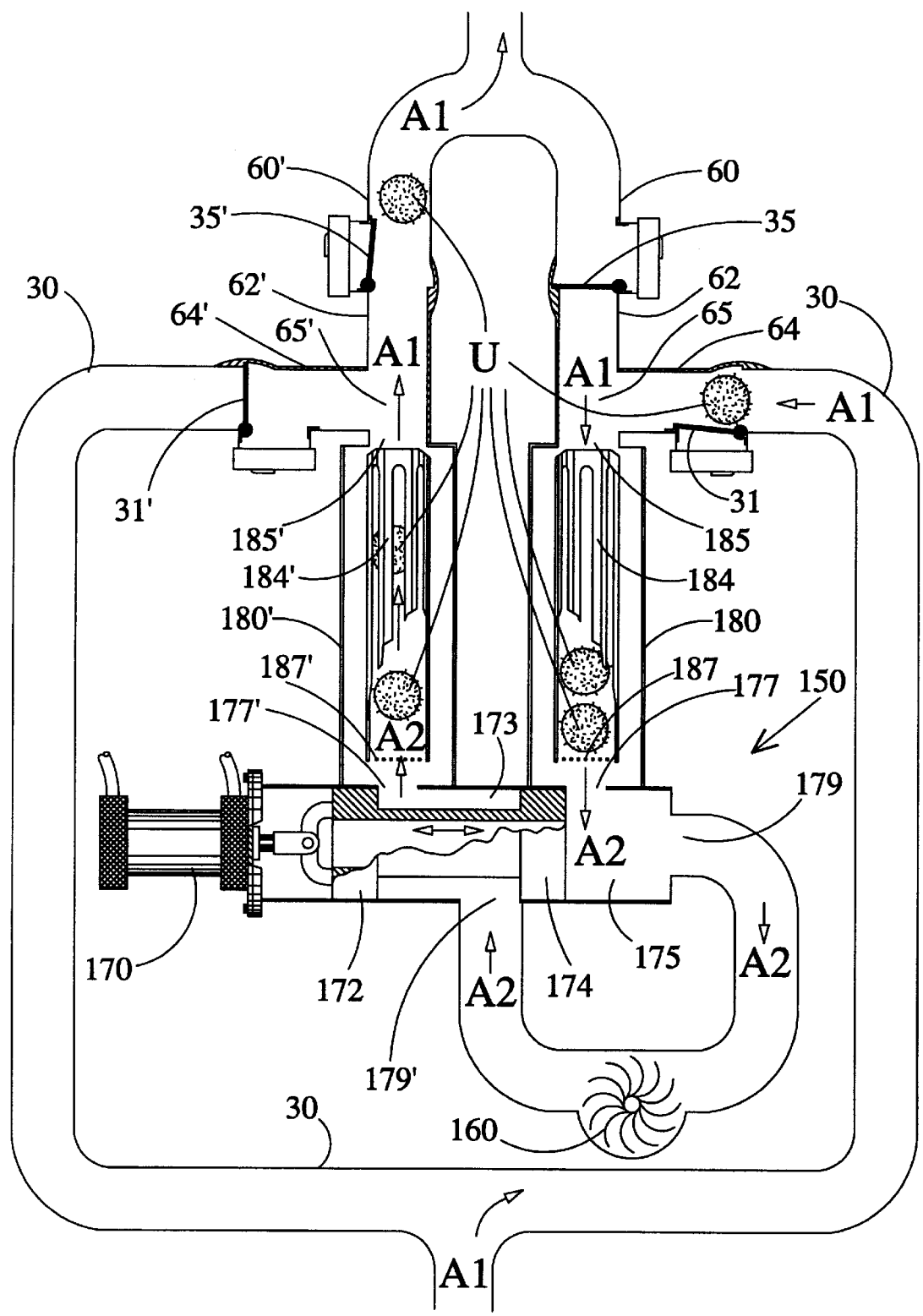
FIGS. 6 and 6a are similar to FIGS. 5 and 5a showing each intersection of the piping system including a cylindrical sea urchin stopper member.
Figure 6A:
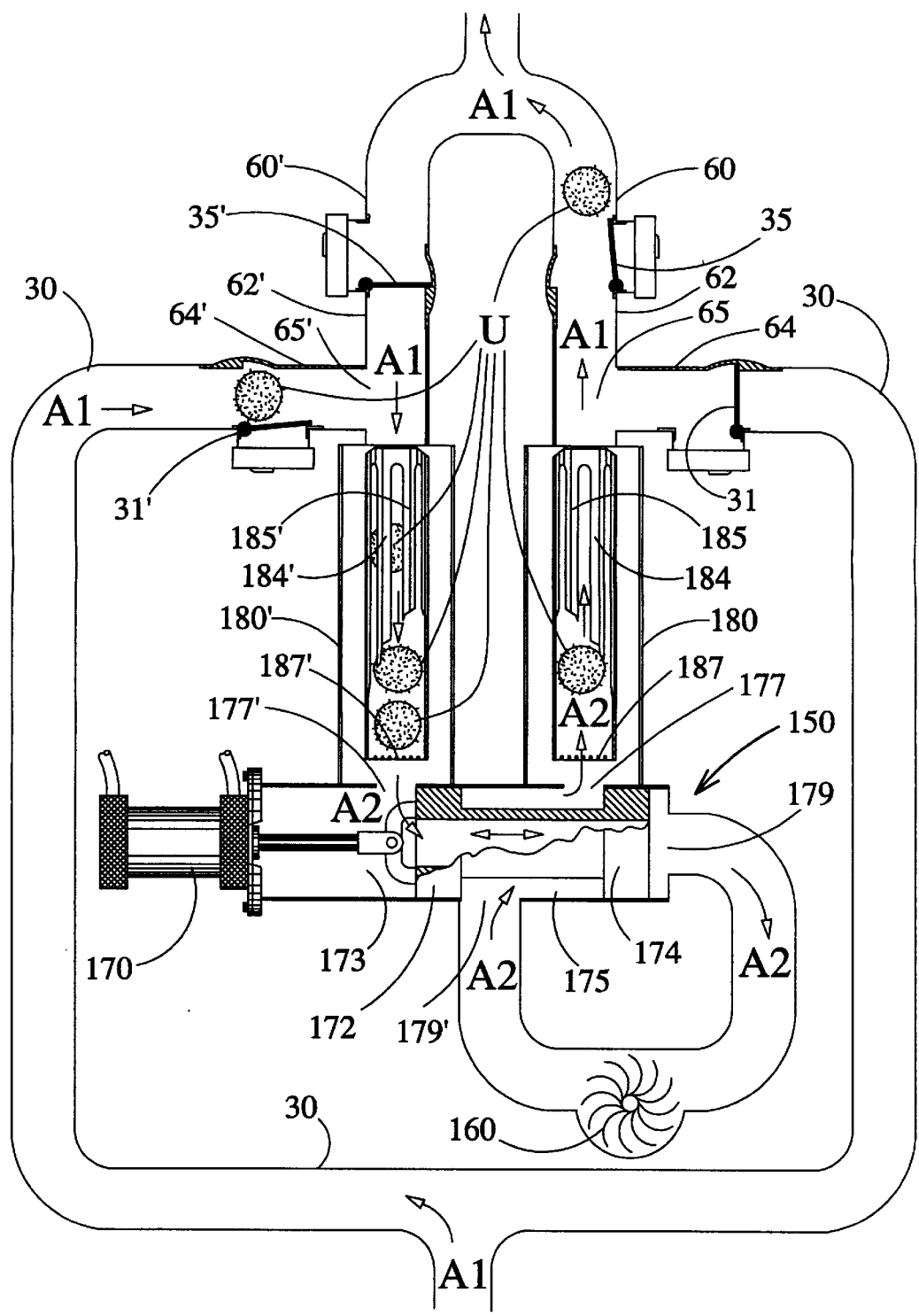

As illustrated in FIGS. 5 to 6a, the first 60 and second 60' piping subsystems have an upstream 62, 62' and a downstream 64, 64' portions relative to the pumping means 150 with a first 31, 31' and a second 35, 35' anti-backflow valves respectively. The upstream 62 and downstream 64 portions of the first piping subsystem 60 merge with the downstream 64' and upstream 62' portions of the second piping subsystem 60' at a first 65 and a second 65' intersections respectively. Both intersections 65, 65' are located in proximity of the pump 150.

The pumping means 150 shown on FIGS. 5 to 6a has a water-vacuum pump 160 and a double-position plunger member 170 having two separate chambers 173, 175 alternately linking two input/output openings 177, 177' connected to a respective intersection 65, 65' with two output/input openings 179, 179' connected to the pump 160 upon position of the plunger 170. Each intersection 65, 65' includes a through-passage chamber 180, 180' with an urchin stopper member 182, 182' for temporarily accumulating a plurality of urchins U coming from its respective upstream portion 62, 62' before being emptied to its respective downstream portion 64, 64'. The plunger 170 is hollowed to allow for water A2 to axially flow therein in on of the two positions of the same (see FIGS. 5a and 6a).

Figure 5A:
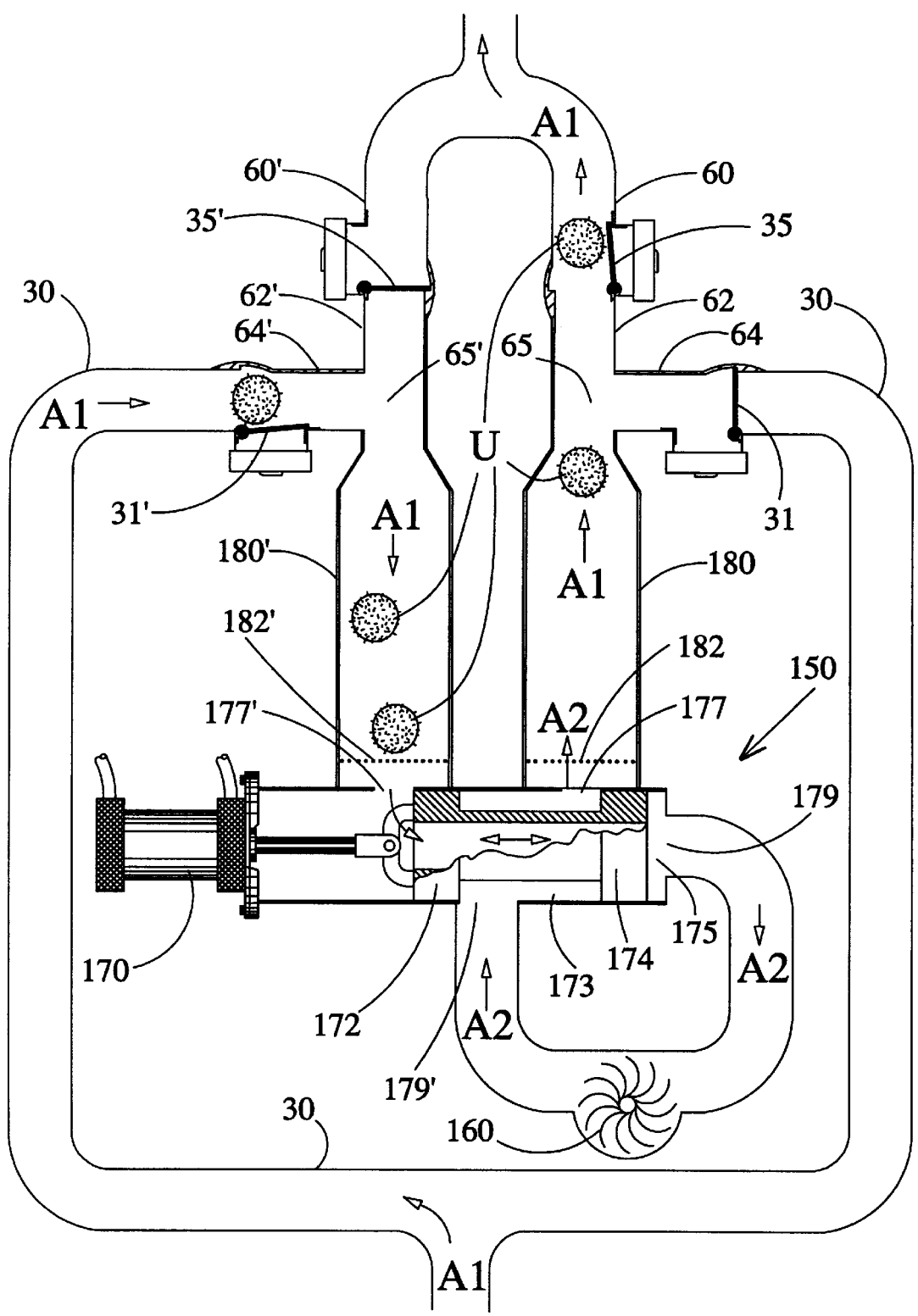

Each intersection 65, 65' of FIGS. 5 and 5a includes a through-passage chamber 180, 180' with an urchin stopper member 182, 182', preferably a wire netting, for temporarily accumulating a plurality of urchins U therein from its respective upstream portion 62,62' before being emptied to its respective downstream portion 64, 64'.

Alternatively, as shown in FIGS. 6 and 6a, the stopper member 182, 182' is a perforated basket 184, 184'. The latter is of a cylindrical shape opened at one end 185, 185' for temporarily receiving urchins U therein in a line-up configuration. Each perforated basket 184, 184' has a diameter adapted to have only one urchin U flowing through at a time.

Figure 4:
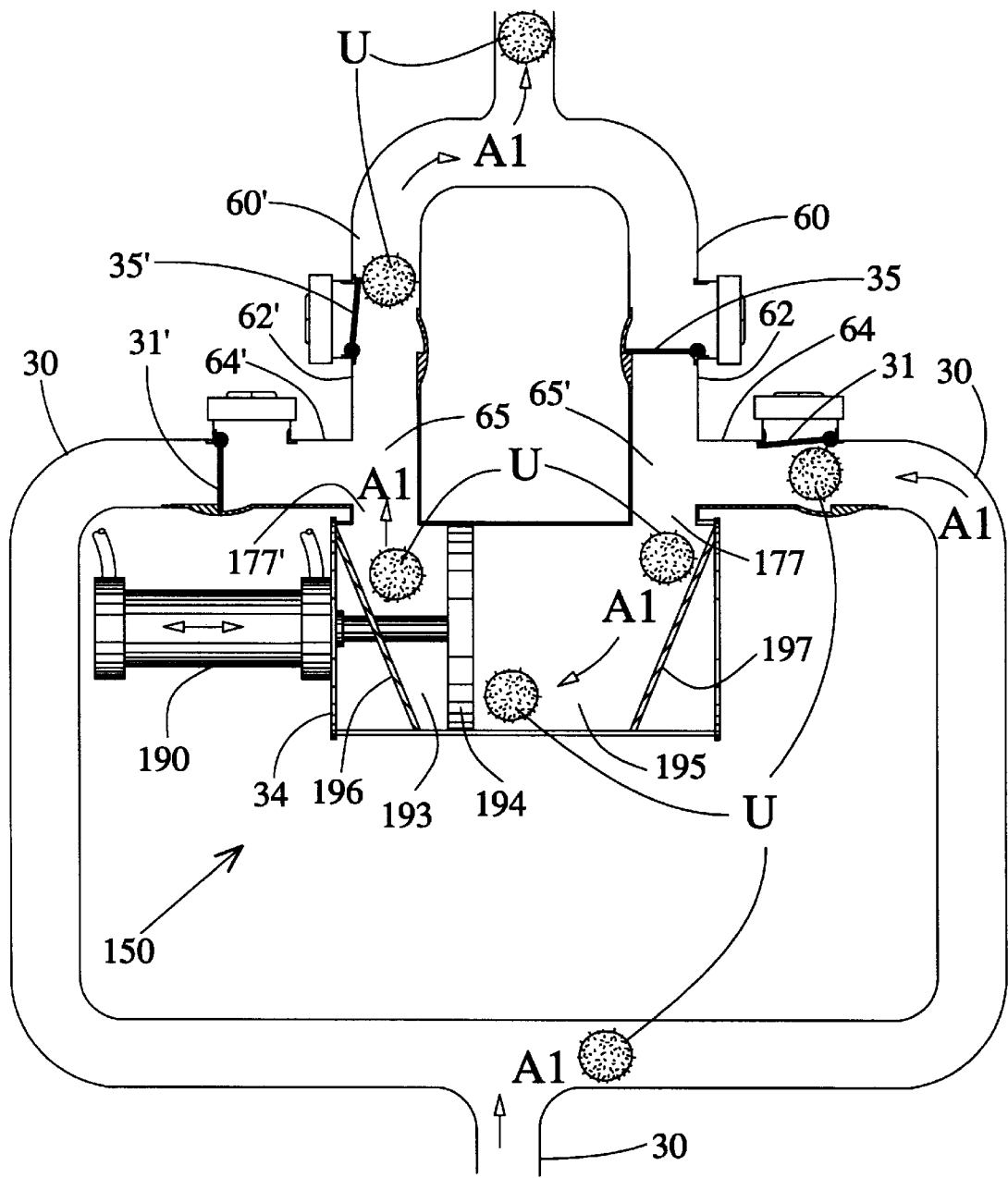
FIG. 4 is a partial section view of a third embodiment of the piping system with a double action piston pump in a first configuration.
Figure 4A:
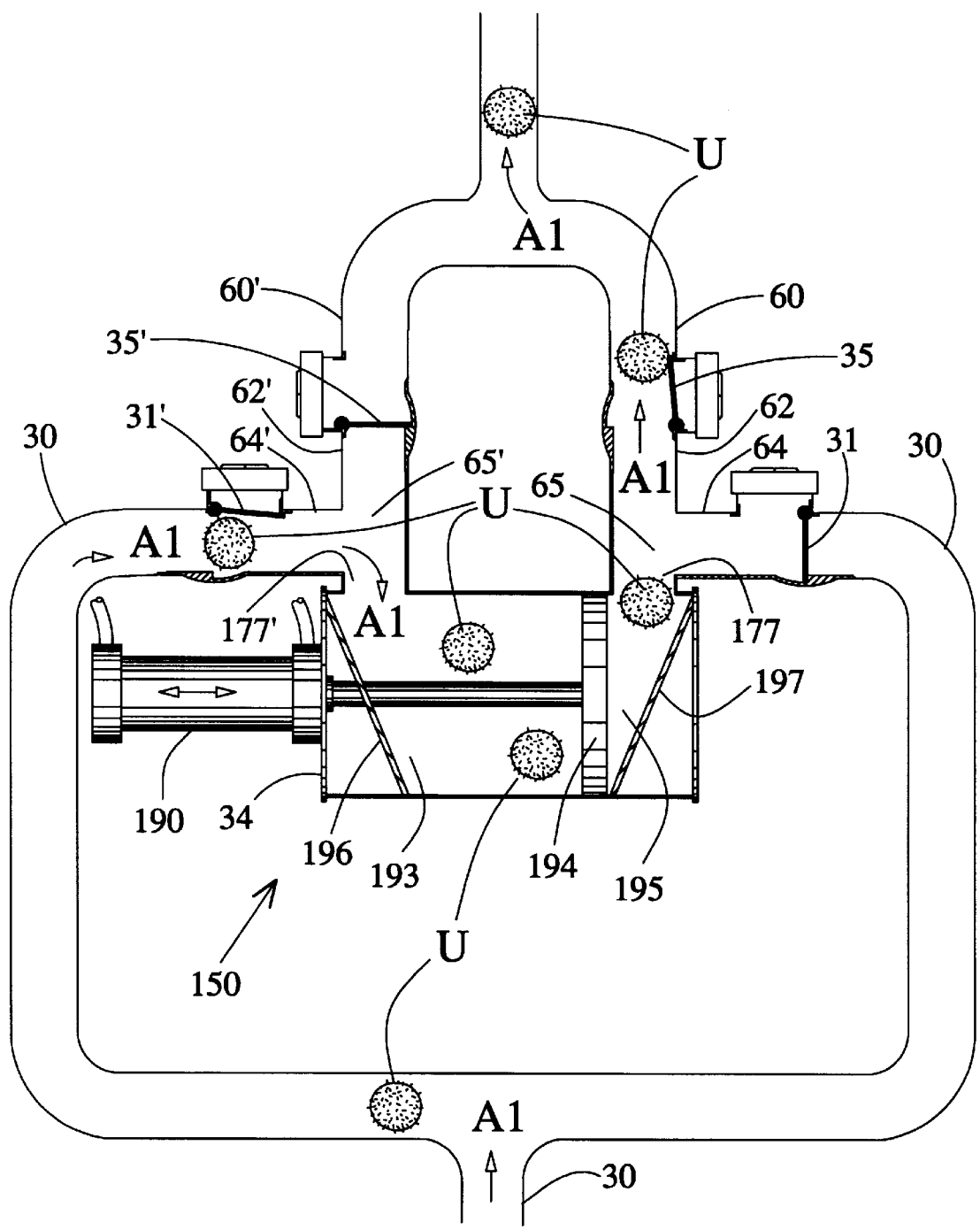
FIG. 4a is a similar to FIG. 4 showing the same embodiment with the pump in a second configuration.

The pumping means 150 illustrated on FIGS. 4 and 4a is a double-action piston pump 190 with a piston 194 separating two adjacent chambers 193, 195 connected to a respective intersection 65, 65'. The chambers 193, 195 are adapted to temporarily receive the sea urchins U therein under the action of the piston 194. Guiding baffles 196, 197 are preferably installed in a respective chamber 193, 195 to allow a better flow of the mixture A1 out of the same through the openings 177, 177'.

When a first tank 70 gets completely filled by sea urchins U, the selective gate 52 changes the conveying direction of the mixture A1 toward the emptied second tank 70', and vice-versa. Urchin-water mixture A1 is conveyed by the pumping means 150 through the picking means 20 (shown on FIG. 1), the piping system 30, the anti-backflow valve 31 or 31', up to the arrival of this mixture A1 in the empty tank 70, 70'. The urchins U are prevented from escaping from the tank 70, 70' by the wire netting 77, 77' or by the netting basket 75, 75'. The flow of the water portion A2 (possibly including small undesired young urchins U or small material picked up from water depth floor F) goes back into the water-filed area W through the drain opening 74, 74', the selective gate 52 and the draining system 50. Simultaneously, whenever desired, some water A3 inside the tank 70, 70' may be evacuated through the draining opening 132, 132'. The exhaust gate 33, 33' of the piping system may also let some air to continuously go there through into the piping system 30 to avoid a situation under vacuum, thus facilitating the conveying through the draining system 50.

Alternatively, the device 10 could also be used for picking and collecting non-living objects such as small minerals and the like of various weight and density, with slight modification to the collecting means 40.

The tank 70, 70' is emptied from collected urchins U by unlocking the latch 140, 140' and opening the bottom wall 130, 130', or by unlocking the lock 120, 120', opening the removable servicing cover 110, 110' and taking out the netting basket 75, 75'. For preventing any shock damage to the urchins U falling into the empty tank 70, 70' at the early filling stage, the latter may get partially filled by water fraction A4 via the replenishment module 90 and its corresponding replenishment submodule 100, 100'. Furthermore, it is recommended to partially fill the tank 70, 70' with water W before start picking urchins U since they are living animals. The longer urchins U will be in water, the longer they will remain alive and keep their freshness.

Materials used for the device 10 should resist to corrosion, such as for example stainless steel, galvanized carbon-steel, some aluminum alloys, brass or bronze alloys, and synthetic/plastic type materials (including a rubber-like material for the flexible tubing 22). A Plexiglas (trademark) window (not shown) could also be installed on the side of one or both of the collecting tanks 70, 70' (not shown). A device 10 could also be equipped by a different detecting means (not shown) to detect when a certain quantity of urchins U has already been collected into each tank 70, 70' in order to avoid obstructing the device 10 or any other piece of equipment used. The selective gate 52 could also have more than two positions, giving the possibility to have with the same pumping means 150 more than two tanks 70 (not shown), as long as corresponding other pieces of equipment are also provided according to the number of tanks 70. It is also possible to replace the existing anti-backflow valves 31, 31' with another selective gate (not shown) synchronized with the same. Alternatively, as illustrated in FIGS. 4 to 6a, it is also possible to have a collecting means 40 being either only one tank 70 (not shown) for collecting urchins U downstream of the piping system 30 or a sorting apparatus or the like (for either living or non-living picked objects).

Although the present device for sea urchins picking has been described with a certain degree of particularity it is to be understood that the disclosure has been may of example only and that present invention is not limited to the features of the embodiments described and illustrated herein, but includes all variations and modifications within the scope of the present invention as hereinafter claimed.

I claim:

1. A sea urchin collecting device for allowing an intended user to individually harvest sea urchins located within a body of liquid, said device allowing for the individual and sequential collecting of sea urchins having an urchin outer diameter below a predetermined threshold outer diameter, said device comprising:

a collecting tube for individually collecting at least one of said sea urchins, said collecting tube defining a tube first end, a tube second end and a tube intermediate segment extending therebetween, said tube defining a tube inner diameter for allowing sequential movement within said tube of individual sea urchins having an urchin outer diameter below said predetermined threshold urchin outer diameter while preventing adjacent sea urchins from being in a side by side relationship within said tube, said tube being manually maneuverable for allowing said intended user to manually position said tube first end adjacent a targeted sea urchin located within said body of liquid;

a pump hydraulically coupled to said tube second end for pumping an urchin-liquid mixture including targeted sea urchins and adjacent portions of said body of liquid into a collecting means, said collecting means being coupled to said pump.

2. A device as recited in claim 1 further comprising a separating means in communication with said collecting means for separating said targeted sea urchins from said portions of said body of liquid.

3. A device as recited in claim 2 wherein said pump and said separating means are positioned on a buoyant body for maintaining said pump and said separating means above the surface of said body of water when said tube first end is positioned below said surface of said body of water in an operational configuration; whereby said tube first end is at least partially decoupled from said pump and said separating means by said collecting tube and said buoyant so as to facilitate manual maneuvering of said tube adjacent said tube first end.

4. A device as recited in claim 2 wherein said separating means is located downstream relative to said pump, said separating means being located between said collecting means and said pump.

5. A device as recited in claim 4 wherein said separating means includes a container, said container being provided with at least one drainage aperture extending therethrough, said drainage aperture allowing said pump to drain liquid out of said container while said container retains said sea urchins therein.

6. A device as recited in claim 2 wherein said separating means includes:

a first container and a second container, each of said first and second containers being provided with at least one corresponding drainage aperture extending therethrough, each of said drainage aperture allowing the drainage of liquid from a corresponding one of said first or second containers and the retention of sea urchins within a corresponding one of said first or second containers;

an hydraulic circuitry including valve means for selectively allowing either one of said first or second containers to be individually filled with said liquid-urchin mixture, whereby said hydraulic circuitry allows said first or second containers to be individually filled with said liquid urchin mixture while the other one of said first or second containers is being individually drained from said liquid.

7. A device as recited in claim 6 further comprising a pre-filling means hydraulically coupled to either one of said first or second containers for ensuring that a corresponding either one of said first or second containers maintains a predetermined minimal amount of liquid therein.

8. A device as recited in claim 7 wherein said pre-filling means includes a pre-filling hydraulic circuitry hydraulically coupled to said corresponding either one of said first or second containers for redirecting a portion of said liquid having been drained from said corresponding either one of said first or second containers into said corresponding either one of said first or second containers.

9. A device as recited in claim 6 wherein said hydraulic circuitry includes:

a first and a second inlet duct hydraulically coupling said tube second end respectively to said first and second containers;

a first and a second inlet duct valve for selectively allowing and preventing the flow of said liquid-urchin mixture respectively in said first and second inlet ducts.

10. A device as recited in claim 9 wherein said hydraulic circuitry further includes;

a first and a second outlet duct respectively hydraulically coupling said first and second containers to said pump;

a pump valve means for selectively allowing and preventing the flow of liquid from said first and a second outlet ducts to said pump.

11. A device as recited in claim 9 wherein at least one of said first or second containers includes a container door, said container door being movable between a door closed configuration and a door open configuration, wherein when said door is in said door closed configuration said container door retains said urchins within a corresponding one of either said first or second containers and wherein when said container door is in said door open configuration said container door allows said urchins to be retracted from a corresponding one of either said first or second containers.

12. A device as recited in claim 11 wherein said container door is positioned so as to be pivotable towards said door open configuration under the action of gravity and wherein said door is provided with a releasable door locking component for releasably locking said container door in said door closed configuration.

13. A device as recited in claim 11 wherein either one of said first or second containers further includes a container basket, said container basket being movable between an extended and a retracted configuration wherein when said container basket is in said retracted configuration said container basket is confined to a corresponding either one of said first or second containers and wherein when said container basket is in said extended configuration at least a portion of said container basket protrudes from said urchin removing aperture for facilitating the retrieval of sea urchins therefrom.

14. A device as recited in claim 2 wherein said pump is a rotary pump, said rotary pump being positioned downstream relative to said separating means.

15. A device as recited in claim 1 wherein said pump includes:

a pump housing defining a first and a second housing aperture;

a first and a second pump inlet ducts, said first and second pump inlet ducts being in fluid communication with said tube second end and respectively with said first and second housing apertures;

a first and a second pump outlet ducts, said first and second pump outlet ducts being in fluid communication with said separating means and respectively with said first and second housing apertures;

a first and a second pump inlet duct valve for selectively allowing and preventing the flow of said liquid-urchin mixture respectively in said first and second pump inlet ducts;

a first and a second pump outlet duct valve for selectively allowing and preventing the flow of said liquid-urchin mixture respectively in said first and second pump outlet ducts;

a reciprocating piston slidably mounted within said pump housing for alternatively increasing and decreasing the hydraulic pressure of said liquid-urchin mixture adjacent said first and second housing apertures;

whereby when said hydraulic pressure is increased by said piston adjacent either one of said first or second housing apertures a corresponding one of said first or second pump inlet duct valve is closed and a corresponding one of said first or second pump outlet duct valve is opened for allowing a fraction of said liquid-urchin mixture within said pump housing to be discharged towards said separating means and the hydraulic pressure is decreased by said piston adjacent the opposed first or second housing apertures with a corresponding one of said first or second pump outlet duct valve closed and a corresponding one of said first or second pump inlet duct valve opened for allowing a fraction of said liquid-urchin mixture emanating from said tube second end to fill at least a portion of said pump housing.

16. A device as recited in claim 1 wherein said pump includes:

a pump housing defining a first and a second housing aperture;

a first and a second pump inlet ducts, said first and second pump inlet ducts being in fluid communication with said tube second end and respectively with said first and second housing apertures;

a first and a second pump outlet ducts, said first and second pump outlet ducts being in fluid communication with said separating means and respectively with said first and second housing apertures;

a first and a second pump inlet duct valve for selectively allowing and preventing the flow of said liquid-urchin mixture respectively in said first and second pump inlet ducts;

a first and a second pump outlet duct valve for selectively allowing and preventing the flow of said liquid-urchin mixture respectively in said first and second pump outlet ducts;

a pressure creating means for increasing the hydraulic pressure of said liquid-urchin mixture within said pump housing;

a reciprocating pump valve slidably mounted within said pump housing for alternatively allowing the flow of said liquid-urchin mixture into or out of said first and second housing apertures.

* * * * *